(12) United States Patent
Butler et al.

(10) Patent No.: US 8,413,454 B2
(45) Date of Patent: Apr. 9, 2013

(54) INTERACTIVE CONTROL SYSTEM FOR AN HVAC SYSTEM

(75) Inventors: William P. Butler, St. Louis, MO (US); Steven L. Carey, St. Louis, MO (US); Hung Pham, Sidney, OH (US); Nagaraj Jayanth, Sidney, OH (US)

(73) Assignee: Emerson Electric Co., St. Louis, MO (US)

( * ) Notice: Subject to any disclaimer, the term of this patent is extended or adjusted under 35 U.S.C. 154(b) by 984 days.

(21) Appl. No.: 11/941,669

(22) Filed: Nov. 16, 2007

(65) Prior Publication Data
US 2008/0073440 A1 Mar. 27, 2008

Related U.S. Application Data

(62) Division of application No. 11/063,806, filed on Feb. 23, 2005, now Pat. No. 7,296,426.

(51) Int. Cl.
*F25D 17/00* (2006.01)
(52) U.S. Cl. ............ 62/180; 62/183; 236/1 C; 236/1 E; 236/91 R; 236/91 F
(58) Field of Classification Search ............... 236/1 C, 236/1 E, 91 R, 91 F; 165/207, 244, 274; 62/180, 183; 417/44.1, 44.11
See application file for complete search history.

(56) References Cited

U.S. PATENT DOCUMENTS

| | | | | |
|---|---|---|---|---|
| 4,400,949 A | * | 8/1983 | Kinoshita et al. | 62/140 |
| 4,878,357 A | * | 11/1989 | Sekigami et al. | 62/160 |
| 5,265,436 A | * | 11/1993 | Murata et al. | 62/175 |
| 5,457,965 A | | 10/1995 | Blair et al. | 62/129 |
| 5,623,834 A | | 4/1997 | Bahel et al. | |
| 6,282,910 B1 | * | 9/2001 | Helt | 62/229 |
| 6,367,270 B2 | * | 4/2002 | Niimi et al. | 62/133 |
| 6,879,881 B1 | * | 4/2005 | Attridge, Jr. | 700/277 |
| 7,032,397 B1 | | 4/2006 | Mueller et al. | |
| 7,143,591 B2 | * | 12/2006 | Nonaka et al. | 62/129 |
| 2004/0154319 A1 | | 8/2004 | Jayanth et al. | |

* cited by examiner

*Primary Examiner* — Frantz Jules
*Assistant Examiner* — Azim Abdur Rahim
(74) *Attorney, Agent, or Firm* — Harness, Dickey & Pierce, P.L.C.

(57) ABSTRACT

An interactive system for controlling the operation of an HVAC system is provided that comprises a thermostat for initiating the operation of the HVAC system in either a full capacity mode of operation or at least one reduced capacity mode of operation, and a controller for an outside condenser unit having a condenser fan motor and a compressor motor, the controller being capable of operating the compressor in a full capacity mode and at least one reduced capacity mode. The system also comprises a controller for an indoor blower unit having a blower fan motor, the controller being capable of operating the blower fan motor in a full capacity mode and at least one reduced capacity mode. The system further includes a communication means for transmitting information between the outside condenser unit controller and at least the indoor blower controller, where the information relates to the operation of the indoor blower and the outdoor condenser unit. The indoor blower controller responsively controls the operation of the blower fan motor in a full capacity mode or a reduced capacity mode based on the information received from the outdoor unit controller, and the outdoor unit controller responsively controls the operation of the compressor in a full capacity mode or a reduced capacity mode based on the information received from the indoor blower controller.

3 Claims, 3 Drawing Sheets

INTERACTIVE CONTROL SYSTEM FOR AN HVAC SYSTEM

CROSS REFERENCE TO RELATED APPLICATIONS

This application is a divisional of U.S. patent application Ser. No. 11/063,806 filed Feb. 23, 2005, which is hereby incorporated herein by reference.

FIELD OF THE INVENTION

The present invention relates to controllers for interactively controlling an HVAC system, and more particularly to an integrated system of HVAC controls for interactively controlling various components in the HVAC system.

BACKGROUND OF THE INVENTION

Many present HVAC systems employ a network for communicating information utilizing a master/slave network arrangement, in which a thermostat or similar central controller is the master that communicates to various slave components within the HVAC system. Such networks require a central communication control, without which the system components may not communicate or interact to operate the HVAC system. Thus, the various HVAC component controllers rely on the master controller to communicate operating instructions and system diagnostics, and each controller does not independently manage its operation based on diagnostic information obtained by other HVAC controllers.

SUMMARY OF THE INVENTION

The present invention provides for an interactive control system for controlling the operation of various controllers in an HVAC system. The interactive system comprises a thermostat for initiating the operation of the HVAC system in either a full capacity mode of operation or at least one reduced capacity mode of operation, and a controller for an outside condenser unit having a condenser fan motor and a compressor motor, the controller being capable of operating the compressor in a full capacity mode and at least one reduced capacity mode. The system also comprises a controller for an indoor blower, which is capable of operating a blower fan motor in a full capacity mode and in at least one reduced capacity mode. The interactive system further includes a communication means for transmitting information between the outside condenser unit controller and the indoor blower controller relating to the operation of the condenser unit components and the blower components, where the indoor blower controller responsively controls the operation of the blower fan motor in a full capacity mode or a reduced capacity mode based on the information received from the outdoor unit controller. The outdoor unit controller may responsively control the operation of the compressor in a full capacity mode or a reduced capacity mode based on the information received from the indoor blower controller.

In one aspect of the present invention, some embodiments of an interactive system may comprise at least two controllers that communicate with each other to provide a method of controlling the operation of an HVAC system in either a full capacity mode of operation or a reduced capacity mode of operation based on the communication between the at least two controllers of information relating to the operation of various components in the HVAC system.

In another aspect of the present invention, some embodiments of an interactive system having two or more controllers are provided that are capable of detecting component operating parameters and communicating the operating parameter information to at least one other controller to enable confirming diagnostics for predicting potential component failure or required servicing. These and other features and advantages will be in part apparent, and in part pointed out hereinafter.

BRIEF DESCRIPTION OF THE DRAWINGS

FIG. 3 is a schematic of one embodiment of the interactive system; and Corresponding reference numerals indicate corresponding parts throughout the several views of the drawings.

DETAILED DESCRIPTION OF THE EMBODIMENTS

Figure 1:
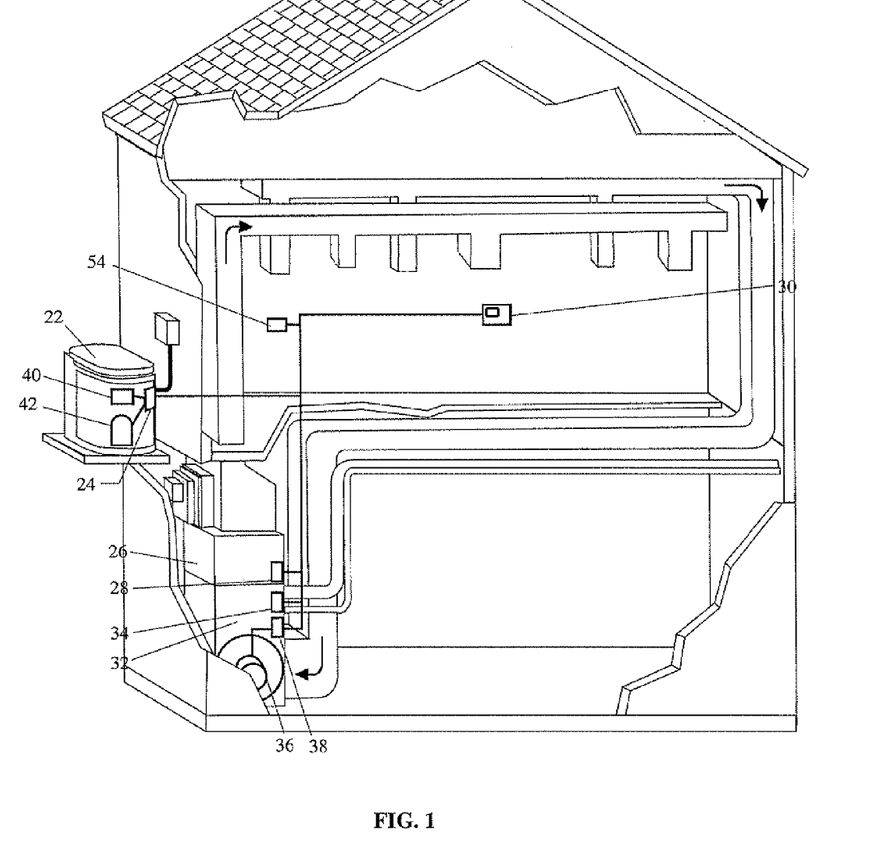
FIG. 1 is an illustration of a building with one embodiment of an interactive control system for an HVAC system according to the principles of the present invention.

One preferred embodiment of a system comprising a plurality of interactive controllers for controlling the operation of an HVAC system in accordance with the principles of the present invention is shown in FIG. 1. As shown and described, the HVAC system preferably includes at least one air conditioner comprising an outdoor condenser unit 22 having a controller 24, at least one indoor blower unit 26 having an indoor blower controller 28 and at least one thermostat 30 for controlling the operation of the various units. The HVAC system preferably comprises a heating unit 32, such as an electric or gas-fired furnace, and a related furnace controller 34. The HVAC system preferably comprises a blower unit 26 having a blower motor 36. The blower motor 36 may further comprise a blower motor controller 38. The thermostat 30 is capable of sensing the temperature within the space and responsively initiating operation of an air conditioning or furnace unit when the sensed temperature is more than a predetermined amount above or below a set point temperature of the thermostat 30. In response to a thermostat signal request for cooling, the outdoor unit controller 24 will control the switching of power to both a condenser fan motor 40 and a compressor motor 42, and the indoor blower controller 28 controls the blower motor 36 or the blower motor controller 38 to provide for air conditioning operation. Likewise, when the thermostat 30 signals a request for heating, the furnace controller 34 controls the activation of the furnace 32 and the blower motor controller 38 controls the blower motor 36 or the blower motor controller 38 to provide for heating operation. Each of the various controllers may be connected to either a high voltage power source or a low voltage power source. The outdoor unit controller 24 may be configured to control a multi-capacity compressor motor 42 and as well as a variable speed condenser fan motor 40. Likewise, the indoor blower controller 28 and the furnace controller 34 may be configured to establish multiple operating speeds of the blower motor 36. The blower motor controller 38 may also comprise an inverter driver for enabling variable speed control of the blower motor.

Figure 3:
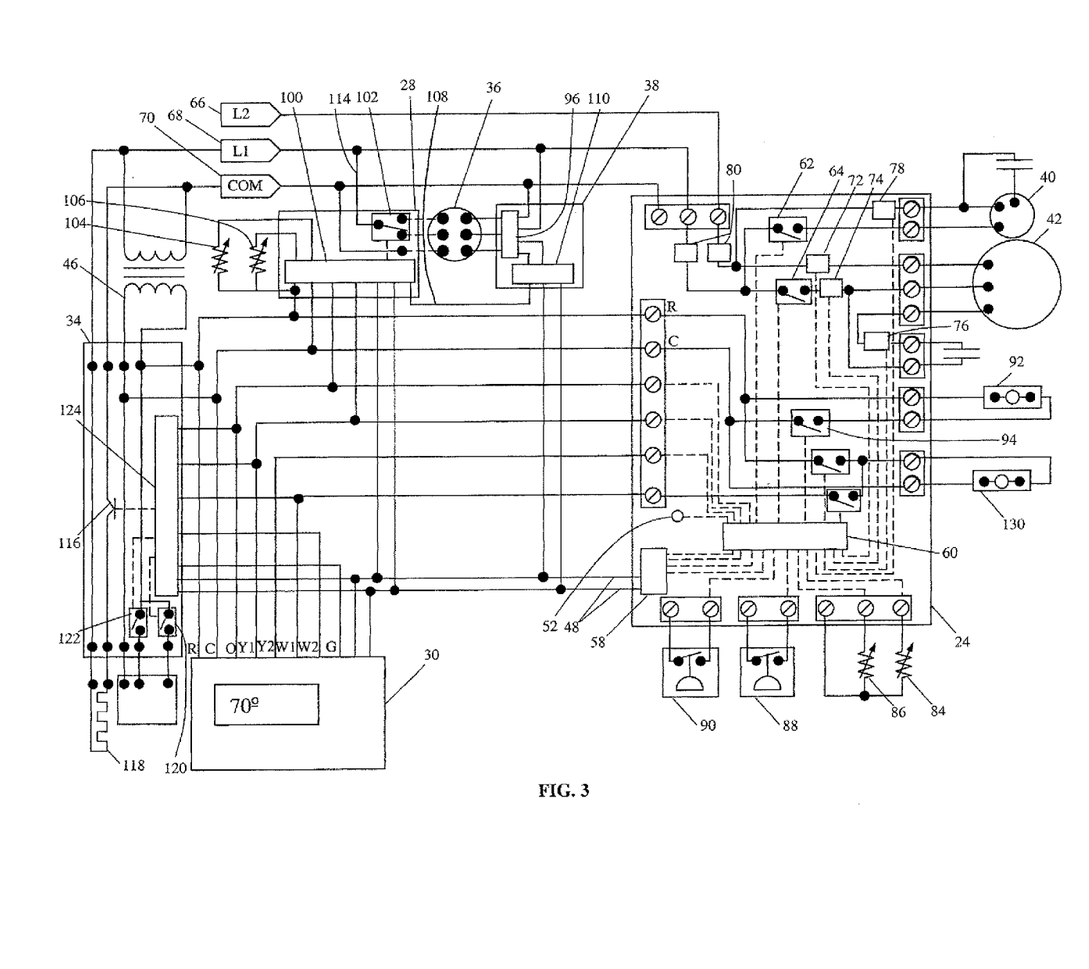

In this first embodiment, the various controllers that control individual components within the HVAC system are further capable of bi-directional communication with each other, to interactively control and improve the operation of the HVAC system. For example, an HVAC system may comprise an indoor blower controller 28 and an outdoor unit controller 24 that communicate via a network that may or may not be in connection with the thermostat 30. Referring to FIG. 3, the thermostat 30 may request low stage cooling by sending a conventional 24 volt signal provided by transformer 46 via a "Y1" line to the indoor blower controller 28 and to the outdoor unit controller 24. During the request for cooling from the thermostat 30, the indoor blower controller 28 may experience a blower motor failure and communicate the fault to the outdoor unit controller 24, which would responsively discontinue operation of the outdoor unit to protect the compressor 42 from being damaged. In this example, the communication between the individual controllers 24 and 28 mitigate damage by discontinuing operation, regardless of whether the thermostat 30 is still calling for low stage cooling operation. It should be noted that the indoor and outdoor controllers 28 and 24 may be used with either a conventional thermostat 30, or a thermostat 30 that is configured to be connected to a communication network 48. Where the thermostat 30 is configured to be connected to a communication network 48, the thermostat 30 may send a cooling signal request via the network 48 or through the conventional 24 volt line connections to the indoor blower unit controller 28 and outdoor unit controller 24. In the above example, a thermostat 30 that is configured to be connected to the communication network 48 would be capable of receiving the blower motor fault signal, and could responsively discontinue the call for cooling and notify the occupant of the blower motor failure. Additionally, the thermostat 30 may also communicate the fault signal to an outside location such as a service contractor or a system monitoring service provider.

Figure 2:
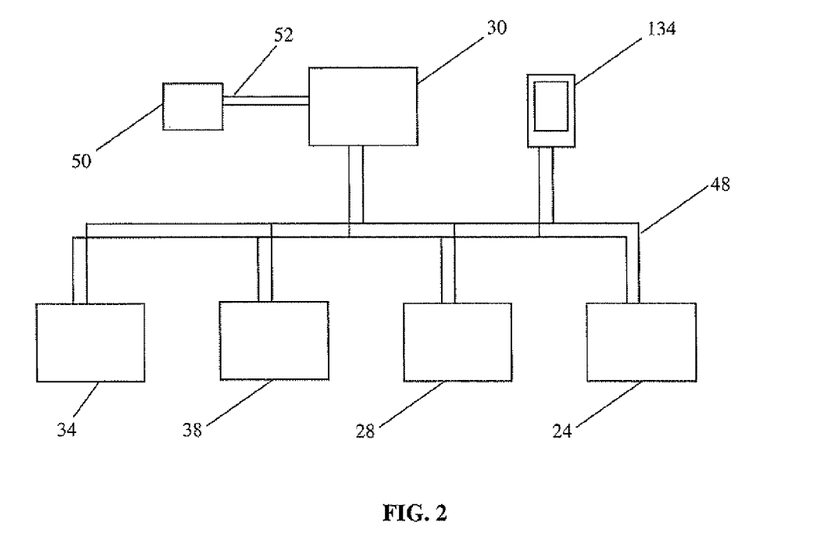
FIG. 2 is a functional block diagram of one embodiment of an interactive system for controlling an HVAC system.

The communication means in this preferred embodiment shown in FIG. 2 comprises a two-wire peer-to-peer network 48, such as an RS-485 peer-to-peer Local Area Network, but may alternatively comprise any other comparable network suitable for use in a peer-to-peer arrangement. The RS-485 network is a two-wire, multi-drop network that allows multiple units to share the same two wires in sending and receiving information. The two-wire network 48 connects to a transmitter and receiver of each controller in the HVAC system (up to 32 controller units). The controllers are always enabled in the receiver mode, monitoring the network 48 for information. Only one transmitter can communicate or occupy the network 48 at a time, so each individual controller is configured to transmit a fixed time period after the last transmission, where each controller has a time period that is unique to that controller. Thus, after one controller completes its transmission, another controller will wait for the prescribed time period before transmitting its information. In this manner, collisions of data transmission from different controllers may be avoided. The transmissions may also include leader information at the beginning of each transmission to identify the transmitting controller.

The network may also be configured to provide for communication with an outside location 50 utilizing, for example, a ModBus link 52, through either the thermostat 30, or through a separate network controller/coordinator, which may provide for an interface or gateway with a ModBus link for communicating between the various component controllers and a ModBus network at an outside location. An example of such a network controller is a RZ 100E RS-485 peer-to-peer network controller sold by Richards Zeta corporation. The network controller/coordinator can send and receive information to and from the various controllers via the network, and may comprise a transceiver for wireless communication of information to a hand held palm or laptop.

Where the thermostat 30 is in communication with the various controllers and also to an external ModBus link 52, the thermostat 30 may transmit specific parameter or diagnostic information relating to the individual controllers and system components to an outside location 50 such as a monitoring service provider. The outside location 50 could also send commands to the thermostat 30 to control the operation of the HVAC system or to request specific operating parameter information. The thermostat 30 could accordingly function as a gateway for communicating with an outside location 50, and could be remotely controlled by the outside location 50.

In one embodiment shown in FIG. 3, the outdoor unit controller 24 may comprise a processor 60 and a plurality of switching means 62, 64 for controlling the switching of line voltage 66, 68 (and common line 70) to the compressor motor 42 and the condenser fan motor. The switching means preferably comprise relays such as a A22500P2 relay manufactured by American Zettler. The condenser fan motor relay 62 and at least one compressor motor relay 64 are also in connection with the processor 60. The processor 60 may be a 28 pin PIC16F microprocessor manufactured by Microchip. Relays 62 and 64 have first and second contacts, at least one of which may be in communication with the processor 60, and preferably at least the non-moving contact of which is in communication with the processor. The processor 60 is able to activate the relay and sense voltage at the stationary contact to verify when the contacts are closed and open. Thus, the processor 60 has the capability of determining when the relay contacts have stuck closed when the processor has requested the relay to be switched to an open position.

The outdoor unit controller 24 can include a low voltage power supply that is preferably a half wave regulated power supply (not shown) comprising a diode in series with a transistor and a regulating capacitor and zener diode for gating the transistor. The power supply may also be a small transformer and zener diode circuit. The low voltage power supply powers the processor 60, which includes a plurality of Analog to Digital data inputs for receiving information from various data inputs in connection with the outdoor unit controller 24. One particular outdoor unit controller 24 that may be used in the present invention is the 49H22 Unitary Control manufactured by White-Rodgers, a Division of Emerson Electric Co.

The outdoor unit controller 24 also receives input from a plurality of sensors 72 through 90 for monitoring operating parameters of the outdoor unit components. These sensors may include current sensors 72, 74 and 76 for sensing the current level in the start winding and run winding of the compressor motor 42, and a sensor 78 for sensing the current in the condenser fan motor 40. Other sensors may include a sensor 80 for sensing the magnitude of the line voltage to the motors, a temperature sensor 82 for sensing the condenser coil temperature, a temperature sensor 84 for sensing the outside ambient temperature, and a temperature sensor 86 for sensing the compressor's refrigerant Discharge Line Temperature (DLT). The compressor of the outdoor unit 22 is preferably a scroll compressor, and may be for example a two-step scroll compressor manufactured by Copeland Corporation. This scroll compressor includes a high capacity operating level and a solenoid 92 for actuating a mid-capacity operating level. The outdoor unit controller 24 controls a switch 94 for actuating the mid-capacity solenoid 92 of the compressor. The outdoor unit controller 24 is configured to provide diagnostic information or codes based on the current values obtained from the current sensors 72, 74 and 78 for monitoring the current in the condenser fan motor 40 and the compressor motor 42. This current sensing may provide diagnostic information or fault codes such as a repeated motor protector trip fault, welded contacts in the switching relays 62 and 64, an open start winding circuit, an open run winding circuit, or a locked rotor current fault. The outdoor unit controller may communicate these failures through a com-port 58 to the network connection 48, and/or may communicate the failures locally through a flashing multi-color status LED. Examples of the diagnostic information or fault codes relating to the compressor or condenser fan that may be communicated are shown in the table below.

TABLE 1

EXAMPLE FAULT CODES FOR AN OUTDOOR COMPRESSOR AND CONDENSER FAN UNIT

| Status LED | Status LED Description | Status LED Troubleshooting Information |
|---|---|---|
| Green "POWER" | Module Has Power | Supply voltage is present at module terminals |
| Red "TRIP" | Thermostat demand signal Y1 is present, but the compressor is not running | 1. Compressor protector is open<br>  Check for high head pressure<br>  Check compressor supply voltage<br>2. Outdoor unit power disconnect is open<br>3. Compressor circuit breaker or fuse(s) is open<br>4. Broken wire or connector is not making contact<br>5. Low pressure switch open if present in system<br>6. Compressor contact has failed open |
| Yellow "ALERT" Flash Code 1 | Long Run Time Compressor is running extremely long run cycles | 1. Low refrigerant charge<br>2. Evaporator blower is not running<br>  Check blower relay coil and contacts<br>  Check blower motor capacitor<br>  Check blower motor for failure or blockage<br>  Check evaporator blower wiring and connectors<br>  Check indoor blower control board<br>  Check thermostat wiring for open circuit<br>3. Evaporator coil is frozen<br>  Check for low suction pressure<br>  Check for excessively low thermostat setting<br>  Check evaporator airflow (coil blockages or return air filter)<br>  Check ductwork or registers for blockage<br>4. Faulty metering device<br>  Check TXV bulb installation (size, location, contact)<br>5. Condenser coil is dirty<br>6. Liquid line restriction (Filter drier blocked if present in system)<br>7. Thermostat is malfunctioning<br>  Check thermostat sub-base or wiring for short circuit<br>  Check thermostat installation (location, level) |
| Yellow "ALERT" Flash Code 2 | System Pressure Trip Discharge or suction pressure out of limits or compressor overloaded | 1. High head pressure<br>  Check high pressure switch if present in system<br>  Check if system is overcharged with refrigerant<br>  Check for non-condensable in system<br>2. Condenser coil poor air circulation (dirty, blocked, damaged)<br>3. Condenser fan is not running<br>4. Return air duct has substantial leakage<br>5. If low pressure switch present in system, refer to Flash Code 1 |
| Yellow "ALERT" Flash Code 3 | Short Cycling Compressor is running only briefly | 1. Thermostat demand signal is intermittent<br>2. Time delay relay or control board defective<br>3. If high pressure switch is present, refer to Flash Code 2<br>4. If low pressure switch present, refer to Flash Code 1 |
| Yellow "ALERT" Flash Code 4 | Locked Rotor | 1. Run capacitor has failed.<br>2. Low line voltage (contact utility if voltage at disconnect is low)<br>3. Excessive liquid refrigerant in compressor<br>4. Compressor bearings are seized<br>  Measure compressor oil level |
| Yellow "ALERT" Flash Code 5 | Open Circuit | 1. Outdoor unit power disconnect is open<br>2. Compressor circuit breaker or fuse(s) is open<br>3. Compressor contactor has failed open<br>  Check compressor contactor wiring and connectors<br>  Check for compressor contactor failure (burned, pitted, or open)<br>  Check wiring and connectors between supply and compressor<br>  Check for low pilot voltage at compressor contactor coil |

TABLE 1-continued

EXAMPLE FAULT CODES FOR AN OUTDOOR
COMPRESSOR AND CONDENSER FAN UNIT

| Status LED | Status LED Description | Status LED Troubleshooting Information |
|---|---|---|
| | | 4. High pressure switch is open and requires manual reset. |
| | | 5. Open circuit in compressor supply wiring or connections |
| | | 6. Unusually long compressor protector reset time due to extreme ambient temperature |
| | | 7. Compressor windings are damaged Check compressor motor winding resistance |
| Yellow "ALERT" Flash Code 6 | Open Start Circuit Current only in run circuit | 1. Run capacitor has failed. 2. Open circuit in compressor start wiring or connections Check wiring and connectors between supply and the compressor "S" terminal 3. Compressor start winding is damaged Check compressor motor winding resistance |
| Yellow "ALERT" Flash Code 7 | Open Run Circuit Current only in start circuit | 1. Open circuit in compressor run wiring or connections Check wiring and connectors between supply and the compressor "R" terminal 2. Compressor run winding is damaged |
| Yellow "ALERT" Flash Code 8 | Welded Contactor Compressor always runs | 1. Compressor contactor has failed closed 2. Thermostat demand signal not connected to module. |
| Yellow "ALERT" Flash Code 9 | Low Voltage Control Circuit <17VAC | 1. Control circuit transformer is overloaded 2. Low line voltage (contact utility if voltage at disconnect is low) Check wiring connections |

In one situation, the outdoor unit controller 24 may respond to sensing an open circuit or locked rotor condition in the condenser fan motor 40 by discontinuing operation of the compressor motor 42 and communicating via the network 48 a condenser fan motor failure to the other controllers 28, 34 and 38 in the HVAC system. The indoor blower controller 28 and blower motor controller 38 could respond by discontinuing operation until the fault condition is removed, regardless of whether the thermostat 30 may be calling for cooling operation. The outdoor unit controller 24 may also respond to sensing an open circuit or locked rotor condition of the compressor motor 42 by discontinuing operation of the condenser fan motor 40 and communicating via the network 48 a compressor motor failure to the other controllers 28, 34 and 38 in the HVAC system. The processor 60 of the outdoor unit controller 24 may also control the speed of the condenser fan motor 40, where a variable speed motor is utilized, based on the sensed ambient temperature data received from the temperature sensor 84. When the thermostat 30 is calling for cooling operation and the sensed outside ambient temperature is relatively low, as in an overnight or early morning situations, the outdoor unit controller 24 may responsively operate the condenser fan motor 40 at a reduced speed for reducing the operating noise level of the outside unit 22.

Likewise, in the situation where the thermostat 30 is calling for cooling and the outdoor unit controller 24 receives a communication via the network connection 48 of an indoor blower motor failure, the outdoor unit controller 24 will respond by discontinuing the operation of the outdoor unit components to protect the compressor motor 42 from possible damage. Similarly, in the situation where the thermostat 30 is calling for high capacity "Y2" second stage cooling, the outdoor unit controller 24 may receive a communication via the network connection 48 of a reduced speed for the indoor blower motor 36 due to overheating of the inverter drive circuit 96 in the blower motor controller 38. The outdoor unit controller 24 will respond by switching relay 94 for actuating the mid-capacity solenoid 92 to operate the compressor at a reduced capacity to correspond to the reduced blower motor speed, regardless of whether the thermostat 30 is calling to high capacity "Y2" second stage cooling. This provides for a limp-along mode that will still provide some degree of cooling, while running the compressor at a capacity corresponding to the reduced speed of the indoor blower motor 36 to provide safe operation for the compressor.

In a situation where the thermostat 30 is calling for full capacity "Y2" second stage cooling and the line voltage 66, 68 to the compressor motor 42 is sensed to be significantly below rated operating voltage of the compressor motor 42, the outdoor controller 24 may discontinue compressor operation at full capacity, and switch the relay 94 for actuating the mid-capacity solenoid 92 to operate the compressor at the mid-capacity level. The outdoor unit controller 24 may then communicate a high capacity compressor lockout fault via the network 48 to the indoor unit controller 28, which would responsively request the blower motor controller 38 to operate the blower motor 36 at the reduced speed corresponding to "Y1" first stage operation, regardless of whether the thermostat 30 is calling for "Y2" second stage cooling. If the thermostat 30 is connected to the communication network 48, the thermostat 30 may respond to the high capacity compressor lock-out fault by only calling for low capacity "Y1" first stage cooling, and by notifying the occupant or an outside location 50 of the low line voltage and high capacity compressor lock-out fault.

The outdoor unit controller 24 may also provide a high side pressure fault, which may be sensed by either a pressure sensor 88 or by the sensed compressor motor current at 72, 74 and 76. For example, in the Copeland scroll compressor, the sensed motor current is approximately linear with respect to the sensed high side refrigerant pressure, and is also an indirect way of measuring the compressor's high side pressure. In the situation where the compressor's high side pressure is excessive, the outdoor unit controller 24 may respond by switching the relay 94 for actuating the mid-capacity solenoid of the scroll compressor to operate the compressor at a mid-capacity level. The outside unit controller 24 may then communicate a high side pressure fault condition via the network 48 to the other system controllers 28, 34, and 38. The indoor blower controller 28 may then respond by requesting the blower motor controller 38 to operate the blower motor 36 at the reduced speed corresponding to "Y1" first stage operation, regardless of whether the thermostat 30 is calling for "Y2" second stage cooling. If the thermostat 30 is connected to the communication network 48, the thermostat 30 may respond to the high capacity compressor lock-out fault by only calling for low capacity "Y1" first stage cooling. The thermostat 30 may also notify the occupant or an outside location 50 of the low line voltage and high capacity compressor lock-out fault. This provides a limp along mode of operation at less than full capacity that will still provide some degree of cooling.

In the above situation of a compressor high side pressure fault, the outdoor unit controller 24 may also provide another limp along mode of operation that limits full capacity compressor operation to a minimum time duration by cycling the compressor on and off. This would still provide some degree of cooling without damaging the compressor.

In the situation where the thermostat 30 is calling for low capacity "Y1" first stage cooling, and the outdoor unit controller 24 senses via the current level that the mid-capacity solenoid 92 of the scroll compressor is not functioning, the outside unit controller 24 will switch the compressor to full capacity operation and communicate a low capacity compressor lock-out fault via the network 48 to the indoor blower controller 28. The indoor blower controller 28 may respond by requesting the blower motor controller 38 to operate the blower motor 36 at full speed to correspond with the full capacity compressor operation, regardless of whether the thermostat 30 is calling for low capacity "Y1" first stage cooling. The outdoor and indoor unit controllers 24 and 28 would continue to operate in only high capacity mode until the low-capacity compressor lock-out fault signal is removed.

Where the outdoor unit controller 24 is used in a heat pump application, the outdoor unit controller 24 may also monitor current of the compressor motor 42 and the outdoor coil temperature to control defrost operation of the compressor. Specifically, an outdoor coil temperature may provide an indication that frost is building up on the condenser coil. The outdoor unit controller 24 can also sense frost build up by monitoring the current in the compressor motor 42, which steadily decreases as the load is hampered by the buildup of frost on the condenser coil. When the compressor motor current decreases by a predetermined amount, the outdoor unit controller 24 can ascertain when to initiate a defrost cycle, in conjunction with or without the temperature value of the outdoor coil. However, a condenser coil temperature sensor is not able to detect the presence of frost across the entire outdoor condenser coil, which may comprise multiple flow circuits. If any portion of the coil still has residual frost, the single coil temperature sensor may not be able to detect the presence of residual frost. When frost has accumulated across the entire outdoor condenser coil, airflow becomes restricted and the current of the condenser fan motor 40 increases as a result of the restriction. Thus, the current of the condenser fan motor 40 may be a better predictor for defrost cycle control, and may be monitored to determine when to either initiate or terminate a defrost cycle through activation or deactivation of reversing valve solenoid 130. The current of the compressor motor 42 will increase quickly during defrost of the condenser coil, and may also be used in conjunction with the current of the condenser fan motor 40 to determine when to either initiate or terminate a defrost cycle.

In yet another situation, the outdoor unit controller 24 may also monitor the compressor motor current at 72, 74, and 76, and the discharge line temperature (DLT) to determine if a low refrigerant charge condition is present. If the outdoor unit controller 24 senses a high relative compressor motor current and a high relative DLT rise immediately after starting the compressor motor 42, the outdoor unit controller 24 would communicate a possible low refrigerant charge condition via the network 48 to the other system controllers 28, 34 and 38.

The processor 60 of the outdoor unit controller 24 may further be adapted to continuously obtain the sensed line voltage 66, 68 and the sensed current levels at 72, 74, and 78 of the compressor motor 42 and condenser fan motor 40 during the operation of theses components. By obtaining this data from the line voltage and motor current sensors, the processor of the outdoor unit controller can compute the apparent power during the run time of the outdoor unit 22, and maintain a running KVA total of the power consumed by the outdoor unit 22. This information may be periodically communicated via the network 48 to other controllers in the system such as a thermostat 30 connected to the network 48. The thermostat 30 could accordingly report the month-to-date estimated energy consumed, or utility costs, to the occupant or user of the thermostat 30. The processor 60 of the outdoor unit controller 24 may also periodically communicate the outside ambient temperature sensed at 84 via the network 48 to other controllers such as the thermostat 30, for example. The thermostat 30 could accordingly adjust its temperature set point based on the ambient temperature sensed at 84 to improve the economic operation of the HVAC system.

In this preferred embodiment of the present invention, an indoor blower controller 28 is provided that comprises a processor 100 and at least one output signal 102 which will request the blower motor controller 38 to operate at a low speed corresponding to "Y1" first stage cooling operation or at a high speed corresponding to "Y2" second stage cooling operation. The indoor blower controller 28 includes a low voltage power supply that is preferably a half wave regulated power supply (not shown) comprising a diode in series with a transistor and a regulating capacitor and zener diode for gating the transistor. The power supply may also be a small transformer and zener diode circuit. The low voltage power supply powers the processor 100, which includes a plurality of Analog to Digital data inputs for receiving information from various data inputs in connection with the indoor blower controller 28. An example of such an indoor blower controller 28 is a 49B Series Control manufactured by White-Rodgers, a Division of Emerson Electric Co.

The indoor blower controller 28 may either receive a call for cool from a thermostat 30 via a conventional 24 volt "Y1" first stage cooling signal or a full capacity "Y2" second stage cooling signal, or may alternately receive a first or second stage cooling signal via the network where thermostat 30 is connected to the network 48. When receiving a request for low capacity first stage cooling from the thermostat 30, the processor 100 of the indoor blower controller 28 communicates a pulsed-width-modulating signal via 108 requesting low speed operation to a variable speed blower motor controller 38. The processor 110 of the blower motor controller 38 receives the signal and responsively controls an inverter driver circuit 96 to establish low speed operation of the blower motor 36. When receiving a request for low capacity "Y1" first stage cooling from the thermostat 30, the indoor blower controller 28 communicates a high speed signal via 108 to the processor 110 of the blower motor controller 38.

The processor 100 of the indoor blower controller 28 may also receive information input from a return air temperature sensor and a supply air temperature sensor, or from temperature sensors across the evaporator or A-coil. If the blower motor controller 38 communicates a blower motor failure via the network 48, the indoor blower controller 28 and outdoor unit controller 24 will respond by discontinuing the operation to protect the compressor and or other components from possible damage. Similarly, in the situation where the thermostat 30 is calling for high capacity "Y2" second stage cooling and the blower motor controller 38 communicates a high speed blower motor fault due to an overheated inverter 96, the indoor blower controller 28 will request the blower motor controller 38 to switch the blower motor 36 to low speed blower operation and communicate a high speed motor blower fault via the network 48 to the outdoor unit controller 24. The outdoor unit controller 24 will respond by switching the relay 94 for actuating the mid-capacity solenoid 92 to operate the compressor at a reduced capacity to correspond to the reduced speed of the indoor blower motor 36, regardless of whether the thermostat 30 is calling to high capacity "Y2" second stage cooling. This provides for a limp-along mode that will still provide some degree of cooling, while running the compressor at a capacity corresponding to the indoor blower motor 36 to provide safe operation for the compressor. The indoor blower controller 28 and the outdoor unit controller 24 may also communicate to each other information that may verify whether a condition with the outdoor unit 22 and a condition with the indoor blower unit 26 confirm a diagnostic problem in the HVAC system. For example, upon receiving a communication from the outdoor unit controller 24 of a possible loss of charge fault, the indoor blower controller 28 will determine the sensed temperatures across the A-coil and compare the temperature difference to a predetermined delta to evaluate whether the difference is out of range. If the temperature difference across the A-coil is below the predetermined delta, the indoor blower controller 28 may communicate the out of range temperature across the A-coil via the network 48, which would confirm that the refrigerant charge is low. This information communicated via the network 48 may be received by a thermostat 30 connected to the network 48, which could then notify the occupant and/or an outside location 50 of the low refrigerant charge condition.

In this preferred embodiment of the present invention, a blower motor controller 38 comprising a processor 110 and an inverter driver 96 for a variable speed blower motor 36 is provided. The blower motor controller 38 may receive a request from either an indoor blower controller 28 or a furnace controller 34 to establish any desired speed of the blower motor 36, within a predetermined operating range. The blower motor controller 38 includes a low voltage power supply that is preferably a half wave regulated power supply (not shown) comprising a diode in series with a transistor and a regulating capacitor and zener diode for gating the transistor. The power supply may also be a small transformer and zener diode circuit. The low voltage power supply powers the processor 110, which includes a plurality of Analog to Digital data inputs for receiving information from various data inputs in connection with the blower motor controller 38.

The blower motor controller 38 further comprises sensors for sensing the voltage to the inverter driver circuit 96, the motor speed, and the temperature of the inverter drive circuit 96. The blower motor controller preferably includes a power module in connection with line voltage, that generates 170 volts DC for the inverter driver 96, which provides three sine wave outputs to the blower motor 36. The blower motor controller 38 is capable of sensing an over-temperature condition in the blower motor 36 or the inverter 96, and responsively reducing the speed of the blower motor 36 to protect the blower motor windings. The blower motor controller 38 then communicates a reduced speed due to an overheating condition to the other system controllers via the network. The indoor blower will respond to this communication by requesting the blower motor controller 38 to switch the motor to low speed blower operation, and communicate a high speed motor blower fault via the network to the outdoor unit controller 24. The outdoor unit controller 24 will respond by switching the relay 94 for actuating the mid-capacity solenoid 92 to operate the compressor at a reduced capacity to correspond to the reduced speed of the indoor blower motor 36, regardless of whether the thermostat 30 is calling to high capacity "Y2" second stage cooling. This provides for a limp-along mode that will still provide some degree of cooling, while running the compressor at a capacity corresponding to the indoor blower to provide safe operation for the compressor.

Where the blower motor controller 38 experiences an overheating condition and responsively reduces the blower motor speed during a call for high stage heating, the blower motor controller 38 communicates the reduced blower speed condition via the network 48 to the furnace controller 34. The furnace controller 34 responds to this communication by responsively switching the operation of the furnace from high stage "W1" operation to low stage "W2" operation, regardless of whether the thermostat 30 is calling for "W1" high stage heating. The furnace controller 34 in this preferred embodiment comprises a processor 124 for controlling the switching of line voltage to the igniter 118, the switching of low voltage to a gas valve relay 120, and low voltage to a second stage gas valve relay 122. In the event the blower motor controller 38 communicates a reduced blower motor speed, the furnace controller 34 will request the blower motor controller 38 to establish the low speed blower motor operation corresponding to the "W2" low heating stage, and communicate a lock-out of high stage heating via the network 48 to the thermostat 30. If the thermostat 30 is connected to the communication network 48, the thermostat 30 may respond to the high stage heating lock-out communicated by the furnace controller 34 by only calling for low stage heating "W1", and by notifying the occupant or an outside location 50 of the high speed blower motor fault. The blower motor controller 38 may also communicate the line voltage value at 114 via the network 48 to the furnace controller 34 for a fuel-fired furnace, which may use the line voltage value at 114 in determining a routine for switching line voltage at 116 to a hot surface igniter 118 for igniting gas, for more accurately controlling the power level to the hot surface igniter. This communication of line voltage information to the furnace controller 34 for a fuel fired furnace improves the life of the hot surface igniter.

In a second embodiment of the present invention, the indoor blower controller 28 of the present invention comprises a processor 100 for controlling at least one switching relay 102 for controlling the selection of a plurality of operating speeds of the indoor blower motor 36. The indoor blower controller 28 may either receive a call for cool from a thermostat 30 via a conventional 24 volt "Y1" first stage cooling signal or a full capacity "Y2" second stage cooling signal, or may alternately receive a first or second stage cooling signals via the network 48 where thermostat 30 is connected to the network. The processor 100 of the indoor blower controller 28 may also receive sensed return air temperature and supply air temperature from temperature sensors 104 and 106 across the A-coil and/or heat exchanger. The processor 100 of the indoor blower controller 28 may also receive the sensed temperatures at the inlet and outlet of the a-coil. In one embodiment of the present invention, the indoor blower controller 28 may be configured for use with a multi-speed blower motor 36 that is directly switched via at least one relay 102 by the indoor blower controller 28. The indoor blower controller 28 is capable of determining a malfunction in either the high speed operation or low speed operation of the motor corresponding to the first and second stage operation of the compressor. In the event that a malfunction occurs in the high speed operation or low speed operation, or both, the indoor blower controller 28 communicates the malfunction via the network to the other system controllers 24, 28, 34 and 38. If the indoor blower controller 28 communicates a complete blower motor failure, the outdoor unit controller 24 will respond by discontinuing the operation of the outdoor unit 22 to protect the compressor from possible damage. Similarly, in the situation where the thermostat 30 is calling for high capacity "Y2" second stage cooling and the indoor unit senses a high speed blower motor failure, the indoor blower will switch the blower motor 36 to low speed blower operation and communicate a high speed motor blower fault via the network 48 to the outdoor unit controller 24. The outdoor unit controller 24 will respond by switching the relay 94 for actuating the mid-capacity solenoid 92 to operate the compressor at a reduced capacity to correspond to the reduced indoor blower motor speed, regardless of whether the thermostat 30 is calling to high capacity "Y2" second stage cooling. This provides for a limp-along mode that will still provide some degree of cooling, while running the compressor at a capacity corresponding to the reduced speed of the indoor blower motor 36 to provide safe operation for the compressor. If the thermostat 30 is connected to the communication network 48, the thermostat 30 may respond to the high speed blower motor fault first second stage cooling, and by notifying the occupant or an outside location 50 of the high speed blower motor fault. The indoor blower controller 28 and the outdoor unit controller 24 may also communicate to each other information that may verify whether a condition with the outdoor unit 22 and a condition with the indoor blower 26 confirm a diagnostic problem in the HVAC system. For example, upon receiving a communication from the outdoor unit controller 24 of a possible loss of charge fault, the indoor blower controller 28 will determine the sensed temperatures across the A-coil and compare the temperature difference to a predetermined delta to evaluate whether the difference is out of range. If the temperature difference across the A-coil is below the predetermined delta, the indoor blower controller 28 may communicate the out of range temperature across the A-coil via the network 48, which would confirm that the refrigerant charge is low. This information communicated via the network 48 may be received by a thermostat 30 connected to the network 48, which could then notify the occupant and/or an outside location 50 of the low refrigerant charge condition.

In various embodiments of the present invention, each of the various controllers 24, 28, 34 and 38 also initially establish a base value for various operating parameters relating to each of the controllers and corresponding components. For example, the blower motor controller 38 may establish a base value for the line voltage and speed of the blower motor 36, and calculate a base Cubic Feet per Minute (CFM) of the blower motor 36. When a predetermined reduction in calculated CFM occurs (indicating a dirty air filter), the blower motor controller 38 may communicate a dirty or clogged air filter condition via the network 48 to the thermostat 30, which may responsively notify the occupant or an outside location 50 of the dirty filter condition. In another situation, a baseline curve of the compressor discharge pressure versus the compressor motor current relative to the ambient temperature could be obtained. Any subsequent variation from the curve relationship between the discharge pressure and compressor motor current values could be used to indicate a fault or to predict degradation and potential failure of the compressor. Likewise, the outdoor unit controller 24 may establish a base value for the DLT and the sensed current at 72, 74 and 76 for the compressor motor 42 relative to the sensed outside ambient temperature at 84. When the DLT and the compressor motor current rise significantly above the relative base line values, the outside controller 24 responsively communicates a possible low charge condition via the network 48 to the thermostat 30. The thermostat 30 may then notify the occupant and/or an outside location of the possible low charge condition.

In various embodiments of the present invention, a thermostat 30 is preferably connected to the network 48 and is capable of receiving diagnostic and fault information communicated from the various controllers 24, 28, 34 and 38 in the HVAC system. However, the interactive system is also capable of operating with other conventional thermostats that are not capable of being connected to the network 48. The thermostat 30 preferably comprises an initial set-up mode that will prompt scheduled operation periods of all of the various controllers and components upon installation, to speed the process of obtaining base line parameter information for the various controllers and components within the system. For example, the thermostat 30 could detect the installation or connection of a compressor via the network 48, and enter a learn mode that initiates scheduled operation of the compressor during the day and night, to quickly obtain a baseline curve of the motor current relative to outside ambient temperature. The thermostat 30 of the present invention is preferably controlled by a processor 128 and is connected to the peer-to-peer network 48 via an RS 485 connection for communicating to the other system controllers 24, 28, 34 and 38 in the HVAC system. The thermostat 30 may further comprise a wireless transmitter and receiver, for receiving transmitted temperature information from a plurality of temperature sensors 54 for a plurality of zones within the space. The thermostat 30 may further comprise a communication board (not shown) in the sub-base of the thermostat 30 that is adapted to provide a gateway connection to an external ModBus communication link 52. The thermostat may receive requests through the ModBus network at an external location 50 to transmit specific parameter information, upon which the thermostat 30 may prompt the various controllers to obtain parameter information for communication to the external location 50. This parameter information can be monitored by an operation monitoring service provider that may predict the possible failure of various components in the system based on degradation in parameter values. One example of an outside monitoring service provider that utilizes a ModBus network is the Emerson Retail Services group which similarly monitors the operation of commercial refrigerator cases.

The thermostat 30 may be configured to receive diagnostic information or fault signals communicated via the network 48, and to display the diagnostic information or fault signal on a display means to alert the occupant. This fault signal may be an icon that flashes, for example synchronously with the signal received from the network 48. The thermostat 30 may also be configured to respond to a fault signal with a standard message such as "FAULT" or "NEEDS SERVICE" that flashes, for example, synchronously with the signal received from the network 48. The fault signal may also be an error code or text message specific to the indoor blower controller 28 or the outdoor unit controller 24. An example of a parameter that may be monitored is the flame signal obtained from a flame probe within a fuel-fired furnace, which the furnace controller 34 could communicate via the network through the thermostat 30. The service provider would then be able to service the flame probe sensor before the furnace controller 38 shut down the furnace operation.

Another example of parameters the thermostat 30 may monitor include the rate of temperature change in each of the zones within the space, which may be compared to an initial baseline rate of temperature change. Over time, the cooling system may experience a gradual reduction in capacity that results in a reduced rate of temperature change for the space. The thermostat 30 may accordingly sense when the rate of temperature change decreases below a predetermined optimum baseline rate of temperature change. The thermostat 30 may compare this data with data received from the outdoor unit controller 24 concerning high motor current and high discharge line temperature indicative of a possible low refrigerant charge. Likewise, the thermostat 30 may also obtain data from the indoor blower unit controller 28 concerning a below normal temperature delta across the A-coil indicating a low refrigerant charge. This comparison of data at various communication nodes provides confirming diagnostics that strengthen predictions of system maintenance and diagnosis. The above situation of a low refrigerant charge could provide notification to a home owner of an inefficiency that often is unnoticed and overlooked. The thermostat 30 could provide notice to the homeowner, who could then service the system and reduce energy costs.

Some embodiments of an interactive HVAC system may further comprise a plurality of zone dampers 56 for controlling the supply of conditioned air to the one or more zones within the space. Either the thermostat 30, or a damper controller, are capable of opening or closing individual zone dampers 56 in response to the temperature sensed by the remote temperature sensors 54 in each zone, to provide conditioned air from the indoor air blower 36 to each zone requiring heating or cooling. The plurality of zone dampers 56 are also preferably connected to the network 48. In response to a signal from the outdoor unit controller 24 via the network 48 of a reduced capacity operation malfunction (resulting in full capacity operation of the compressor 42 and indoor blower motor 36), the thermostat 30 responsively would communicate a request signal to open each zone damper to correspond to a full capacity operation mode. Likewise, in response to a signal from the outdoor unit controller 24 via the network 48 of a full capacity operation malfunction (resulting in reduced capacity operation of the compressor 42 and indoor blower motor 36), the thermostat 30 responsively would communicate a request signal to open only a minimum number of dampers to correspond to the reduced capacity operation mode.

In addition to the above thermostat 30, or where the interactive system operates with a conventional thermostat that is not connected to the network 48, a separate interface controller (not shown) may be connected to the network 48 for providing communication between the various controllers and a user or outside location 50. The separate interface controller would be capable of providing the same gateway connection to an external ModBus communication link as in the afore described thermostat embodiment, and may also comprise an interface and display means for user access of system information. The interface controller therefore would allow a user or service technician to obtain diagnostic information and operating parameters relating to the HVAC system components, and would also provide for communication of diagnostic information to an outside location 50 such as a monitoring service provider. The interface controller would be able to receive information from the various indoor and outdoor unit controllers to provide confirming diagnostics for predicting potential component failure or required servicing, and communicate such information to the user, service technician, or an outside party.

Thus, various embodiments of an interactively controlled HVAC system having a plurality of HVAC components comprise one or more controllers for controlling one or more components of the HVAC system. Some embodiments comprise at least one controller for operating a component of the HVAC system, the controller modifying the operation of the component in response to information received about the operation of another component of the HVAC system. The table below illustrates how various embodiments of an interactive system can comprise a combination of controllers, which controllers control certain components (indicated by C) and may modify the operation of its respective components in response to information received about the operation of other components (indicated by I) of the HVAC system.

| Controller | Compressor (multi-stage) | Condenser fan (multi-speed) | Outdoor sensors | Indoor A-coil temperature | Blower motor (multi-speed) | Furnace (multi-stage) | Zone dampers | Zone temperature sensors | ModBus network or gateway |
|---|---|---|---|---|---|---|---|---|---|
| Outdoor unit controller | C | C | I | I | I | | | | I |
| Indoor blower controller | I | I | | | C | I | I | | I |
| Blower motor controller | I | I | | I | C | I | I | | I |
| Furnace controller | X | X | X | X | C/I | C | I | | I |
| Thermostat control | C/I | C/I | I | I | C/I | C/I | C/I | I | I |
| Damper controller | | | | | I | | C | I | I |

Some embodiments of the present invention may also comprise a Personal Digital Assistant, PALM, or a computer or hand held device 134 may also be connected to the peer-to-peer network, for receiving operating information relating to the various controllers and components in the HVAC system. Such a device could be connected to the RS-485 network by a service technician during installation or servicing for troubleshooting and diagnosing the various components in the HVAC system. The hand held device 134 or computer could request parameter information and display the values of various sensors associated with the controllers connected to the network within the HVAC system, and display the information for the service technician. Such a device could include a hand held palm, which could be easily connected and programmed to receive and parse the information being communicated between the various HVAC controllers. It should also be noted that some of the components of the HVAC system may also communicate wirelessly with the network through the use of a transceiver unit in connection with the peer-to-peer network.

In a third embodiment of the present invention, the outdoor unit controller 24' may comprise a processor 60 and a means for communicating with a compressor diagnostic unit associated with the compressor. The compressor diagnostic unit comprises current sensing means and voltage sensing means for sensing the level of line voltage as well as the current in the run windings and the start windings of the compressor motor 42. The outdoor unit controller 24' of the second embodiment comprises relays (62 or 64) for switching power to the compressor motor 42, and receives current and voltage information from the compressor diagnostic unit rather than directly monitoring the current to the compressor motor 42. The compressor diagnostic unit passively monitors the current in the compressor motor 42 and communicates compressor diagnostic information to the outdoor unit controller 24' or directly to the thermostat 30. The second embodiment the outdoor unit controller 24' can communicate much of the same diagnostic information and faults as described in the first embodiment, to provide diagnostic information to other components on the network 48 such as the thermostat 30. The outdoor unit controller 24' may also switch compressor operation from high capacity to the mid-capacity level, based on information received from the compressor diagnostic unit. The compressor diagnostic unit may also communicate compressor operating parameters and diagnostic information directly to the thermostat 30, which may responsively control cooling request signals for activating the compressor motor 42 and condenser fan motor 40. The thermostat 30 is therefore capable of initiating or activating the compressor motor 42 and the compressor fan motor 40, based on the information received from the compressor diagnostic unit or the outdoor unit controller 24'. The thermostat 30 may further request full capacity operation or less than full capacity operation, based on information communicated by the compressor diagnostic unit or outdoor unit controller 24'. An example of a thermostat 30 that may receive direct communication from a compressor diagnostic unit is disclosed in U.S. patent application Ser. No. 10/750,113 entitled "Thermostat for use with compressor health indicator", which is incorporated herein by reference. An example of a compressor diagnostic unit that may sense compressor operating parameters is disclosed in U.S. patent application Ser. No. 10/625,979 entitled "Compressor Diagnostic System For Communicating With An Intelligent Device, which is incorporated herein by reference. The compressor diagnostic unit may also communicate a high side pressure fault condition, which may be sensed by either a pressure sensor 88 or by the compressor motor current. For example, the compressor diagnostic unit may sense a compressor motor current that may indirectly indicate a compressor high side refrigerant pressure, and may respond by communicating this high side pressure fault to either the outdoor unit controller 24' or the thermostat 30. The thermostat 30 may respond by subsequently providing a request signal for high capacity of "Y2" second stage, rather than a request signal for low capacity operation of "Y1" first stage. The thermostat 30 may accordingly perform the switching of the compressor operation from high capacity to the mid-capacity level based on information received from the compressor diagnostic unit. Thus, this second embodiment of an outdoor unit controller 24' provides for passive control of the compressor, through the interactive communication with a compressor diagnostic unit of various operating parameters and faults to the thermostat 30 or outdoor unit controller 24'.

Advantages of the above described embodiment and improvements should be readily apparent to one skilled in the art, as to enabling interactive communication between various controllers for controlling and improving the operation of an HVAC system. Additional design considerations may be incorporated without departing from the spirit and scope of the invention. Accordingly, it is not intended that the invention be limited by the particular embodiment or form described above, but by the appended claims.

What is claimed is:

1. A controller for an indoor blower unit of an HVAC system capable of operating in a full capacity mode and at least one reduced capacity mode, the controller comprising:
    a communication means for receiving information relating to the operating capacity of a compressor from at least one other HVAC system component separate from the indoor blower unit, wherein the communication means comprises a peer-to-peer network connection that enables reception of information from at least an outdoor unit controller and sending of information to at least the outdoor unit controller;
    a processor for controlling the operation of an indoor blower fan motor in a full capacity mode of operation and in at least one reduced capacity mode of operation, wherein the processor receives information relating to a change in operating capacity of the compressor from the at least one other HVAC system component and responsively operates the indoor blower fan motor in a full capacity speed or a reduced capacity speed based on the received information relating to a change in the operating capacity of a compressor,
    where in response to receiving information that the compressor is only able to operate at a reduced capacity, the processor responsively controls the operation of the indoor blower fan motor in at least one reduced capacity speed.

2. A controller for an indoor blower unit of an HVAC system capable of operating in a full capacity mode and at least one reduced capacity mode, the controller comprising:
    a communication means for receiving information relating to the operating capacity of a compressor from at least one other HVAC system component separate from the indoor blower unit, wherein the communication means comprises a peer-to-peer network connection that enables reception of information from at least an outdoor unit controller and sending of information to at least the outdoor unit controller;
    a processor for controlling the operation of an indoor blower fan motor in a full capacity mode of operation and in at least one reduced capacity mode of operation, wherein the processor receives information relating to a change in operating capacity of the compressor from the at least one other HVAC system component and responsively operates the indoor blower fan motor in a full capacity speed or a reduced capacity speed based on the received information relating to a change in the operating capacity of a compressor,
    where in response to receiving information that the compressor is only able to operate at full capacity, the processor responsively controls the operation of the indoor blower fan motor in a full capacity speed.

3. The controller of claim 2 wherein the controller communicates information relating to the operating condition of the indoor blower fan motor to one of a thermostat or the outdoor unit controller.

* * * * *